United States Patent [19]

Hoegberg

[11] Patent Number: 5,303,769
[45] Date of Patent: Apr. 19, 1994

[54] INTEGRATED THERMOSIPHON HEAT EXCHANGER APPARATUS

[75] Inventor: Otto H. Hoegberg, Houston, Tex.

[73] Assignee: The M. W. Kellogg Company, Houston, Tex.

[21] Appl. No.: 952,073

[22] Filed: Sep. 25, 1992

[51] Int. Cl.⁵ .............................................. B01D 3/32
[52] U.S. Cl. ................................... 165/108; 165/110; 165/140; 202/153
[58] Field of Search ............... 165/140, 108, 110; 202/153

[56] References Cited

U.S. PATENT DOCUMENTS

| | | | |
|---|---|---|---|
| 2,132,150 | 10/1938 | Fenske | 165/145 |
| 2,204,447 | 6/1940 | Samans | 165/145 |
| 2,795,536 | 6/1957 | Grossberg et al. | 202/153 |
| 3,147,084 | 9/1964 | Franzen et al. | 165/140 |
| 3,507,323 | 4/1970 | Ronnholm et al. | 165/159 |
| 3,832,289 | 8/1974 | Kays et al. | 202/174 |
| 4,456,779 | 6/1984 | Owen et al. | 585/415 |
| 4,778,003 | 10/1988 | Helberg | 165/108 |
| 5,037,955 | 8/1991 | Dighton et al. | 528/501 |
| 5,048,601 | 9/1991 | Yamaguchi et al. | 165/140 |

Primary Examiner—Albert W. Davis, Jr.
Attorney, Agent, or Firm—John P. Ward

[57] ABSTRACT

A thermosiphon reboiler heat exchanger which integrates multiple parallel reboilers into a single unit and a heating method are disclosed. The present heat exchanger utilizes a compartmentalized shell for vaporizing a tube-side liquid with a plurality of hot shell-side fluids. The present apparatus is particularly useful for a fractionation system in a phenol manufacture process.

8 Claims, 1 Drawing Sheet

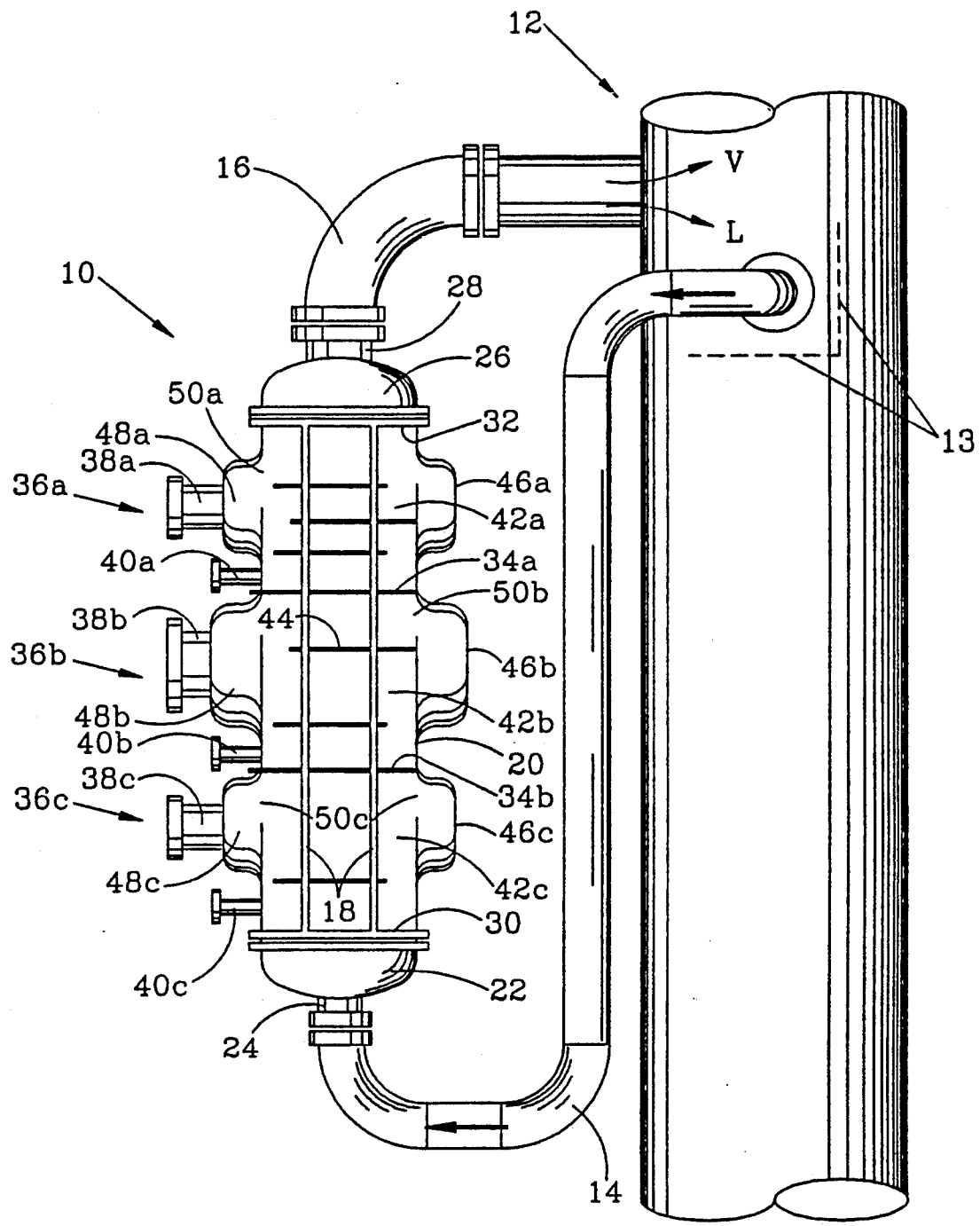
FIGURE

INTEGRATED THERMOSIPHON HEAT EXCHANGER APPARATUS

FIELD OF THE INVENTION

The present invention relates to an integrated heat exchanger apparatus for heating a tube-side fluid with a plurality of hot shell-side fluids. More particularly, the present invention relates to a vertical, integrated thermosiphon reboiler for a fractionation column comprising a plurality of vertical tubes arranged in an integrated shell compartmentalized to accept multiple shell-side heat exchange fluids.

BACKGROUND OF THE INVENTION

A thermosiphon reboiler can be used in certain instances to save pumping costs in a fractionation column. The reboiler forms one hydraulic leg and the column another in a U-shaped "siphon" network. As vapor return lowers the hydraulic head of the reboiler leg, additional liquid feeds hydraulically from the fractionator to maintain a head equilibrium between the legs. Such thermosiphon reboilers are well known in the art.

Thermosiphon reboilers are commonly used on a variety of distillation towers in manufacturing processes. Increased efforts to improve energy efficiency in the processes have resulted, in some instances, in an addition of multiple separate reboilers piped in parallel with a common feed line so that several different hot process and/or utility streams can be used as heating fluids by supplying each of the hot streams to a separate reboiler. Therefore, reboil flowrate through each of the individual reboilers depends on a complicated resolution of the head differentials in each parallel leg. It can be seen that carefully balanced piping schemes and complex flow controls must be used to maintain adequate flow through each reboiler as process conditions change. Even so, flow upset and startup difficulties can still frequently occur. It is therefore desirable to reduce piping and control complexities as well as opportunity for process upset due to flow imbalances by integrating separate heat exchangers into a single unit.

U.S. Pat. No. 5,048,601 to Yamaguchi et al. describes a shell-and-tube reactor including a vessel having at least one intermediate tube plate sectioning the interior of the vessel into at least two compartments having different temperatures.

U.S. Pat. No. 5,037,955 to Dighton et al. describes a single pass, horizontal shell and tube heat exchanger made in three sections which can be independently heated.

U.S. Pat. No. 3,832,289 to Kays et al. describes preheater for use in a multieffect distillation system comprising a housing having a plurality of chambers with a conduit means extending axially through each of the chambers U.S. Pat. No. 2,204,447 to Samans describes a compact catalytic reactor apparatus for securing uniform heat exchange throughout the body of the catalyst. The apparatus has a shell divided into a plurality of cylindrical sections surrounding a tube bundle with catalyst in the spaces between the tubes.

U.S. Pat. No. 2,132,150 describes a method and apparatus for contacting liquid phases wherein the contact zone comprises packing members which may be segregated from each other in separate casings.

SUMMARY OF THE INVENTION

A fractionation column thermosiphon reboiler for vaporizing a tube-side liquid with a plurality of hot shell-side fluids integrates multiple prior art reboilers into a single unit to enhance operational reliability and reduce capital costs. In addition, complex piping and flow control loops previously required to insure balanced flows are eliminated.

In one embodiment the present invention provides an integrated heat exchanger apparatus for heating a tube-side fluid with a plurality of hot shell-side fluids. The apparatus comprises a shell and a plurality of tubes extending vertically through the shell in fluid communication with upper and lower heads on either end thereof. A thermosiphon feed line from a thermosiphon feed reservoir to the lower head provides a process feed for the tubes. A liquid-vapor return line from the upper head to the reservoir returns the partially vaporized feed to the feed reservoir to complete the thermosiphon circuit. Upper and lower tube sheets sealingly engage the tubes between the shell and the upper and lower heads, respectively. There is at least one intermediate tube sheet sealingly engaging the tubes and disposed between the lower and upper tube sheets to form a plurality of shell-side compartments. A hot fluid supply and return line for each of the compartments circulates the hot fluid therethrough to heat and vaporize the tube-side fluid. The hot fluid in one or more of the compartments preferably comprises an overhead vapor from a fractionation column for providing at least a part of the reflux condensate for the column and the hot fluid in at least one of the compartments preferably is steam for process control.

In another embodiment, the present invention provides an improved fractionation column thermosiphon reboiler apparatus, wherein a feed from the column is heated for reboil by a plurality of hot fluid streams and returned, partially vaporized, to the column. The improvement comprises an integrated, vertical shell and tube heat exchanger having a corresponding plurality of separate compartments in the shell for circulation of a hot fluid stream through each compartment in heat exchange with the fluid in the tubes extending vertically therethrough.

In a further embodiment, the present invention provides a method for supplying reboil heat to a fractionation column with a plurality of hot fluid streams. As one step, a liquid is supplied by a thermosiphon circulation system from the column to a lower head of an integrated vertical shell and tube thermosiphon reboiler. As another step, the liquid is passed from the lower head into a plurality of tubes which extend upwardly from the lower head to an upper head, wherein the tubes pass through a shell separated into a plurality of compartments formed by a tube sheet disposed between each adjacent compartment. As a further step, hot fluid is circulated through each compartment to heat and vaporize at least partially the liquid in the tubes. The partially vaporized fluid from the tubes is collected in the upper head and fed to the fractionation column.

BRIEF DESCRIPTION OF THE FIGURE

The Figure shows a schematic view of the integrated vertical reboiler of the present invention.

DETAILED DESCRIPTION OF THE INVENTION

A fractionation column thermosiphon reboiler having unified tubes and a compartmentalized shell integrates multiple reboilers used in a prior art network into a single heat exchanger apparatus. By eliminating a potential for flow imbalance between reboilers in the network, the present integrated reboiler reduces capital costs and improves process reliability.

Referring to the Figure, an integrated thermosiphon reboiler 10 having a shell and tube design is shown vertically disposed adjacent a thermosiphon feed reservoir such as, for example, a fractionation column 12 having a tray 13. The reboiler 10 provides reboil vapor for the fractionation column 12. The reboiler 10 has an inlet line 14 for passing liquid feed from the column 12 and a liquid-vapor outlet line 16 for returning reboil vapor V and a liquid L to the column 12. In the reboiler 10, liquid feed flowing through tube-side tubes 18 becomes partially vaporized by heat transfer with a plurality of hot shell-side fluids.

The reboiler 10 comprises a shell 20 including a lower head 22 having an inlet pipe 24 and an upper head 26 having an outlet pipe 28. Liquid feed flowing through the line 14 is collected in the lower head 22 and distributed among the tubes 18. As is conventional, the tubes 18 are bundled by a lower tube sheet 30 and an upper tube sheet 32. The lower tube sheet 30 is sealingly received in the lower head 22 and the upper tube sheet is sealingly received in the upper head 26 to provide a tube-side passage for the feed liquid through the tubes 18. The liquid-vapor stream passing from the tubes 18 is collected in the head 26 for return in the line 16 to the column 12.

In the present apparatus, the shell 20 also includes one or more intermediate tube sheets sealingly engaging the tubes 18 and an interior wall of the shell 20 vertically spaced from the lower and upper tube sheets 30, 32. In such manner, the intermediate tube sheets define compartments around an exterior surface of the tubes 18 in the shell 20. As shown in the Figure, a pair of intermediate tube sheets 34a, 34b define compartments 36a, 36b, 36c.

The compartments 36a, 36b, 36c each have an inlet pipe 38a, 3b, 38c for receiving a hot shell-side heating fluid which can be either gas or liquid, an outlet pipe 40a, 40b, 40c for providing egress for the heating fluid cooled and/or condensed by the heat exchange process and for defining a passage 42a, 42b, 42c for the heating fluid. The passages 42a, 42b, 42c preferably have one or more conventional baffles 44 to insure adequate contact with the external surface of the tubes 18, as is known in the art, and to prevent unwanted channeling. The heating fluid is circulated through the passages 42a, 42b, 42c, preferably countercurrently, in a conventional manner.

Each compartment 36a, 36b, 36c is preferably provided with an outer chamber 46a, 46b, 46c having the inlet pipe 38a, 38b, 38c affixed thereto, and defining an annular channel 48a, 48b, 48c having an annular opening 50a, 50b, 50c. The outer chamber 46a, 46b, 46c preferably serves as a vapor distribution belt for the hot shell-side fluid and as an expansion bellows to accommodate differential expansion between the tubes 18 and the shell 20. Design of the outer chambers 46a, 46b, 46c can be determined from mechanical and hydraulic principles.

As mentioned previously, the heating fluid in each compartment 36a, 36b, 36c can be different or the same. Various process and/or utility streams can be used depending on ordinary design criteria. In the present apparatus, the heating fluid in one or more of the compartments 36a, 36b, 36c is preferably made up of a process vapor taken, for example, from an upper tray or an overhead stream of a fractionation column for providing at least a part of a reflux condensate for the column. The heating fluid in at least one of the compartments 36a, 36b, 36c is preferably steam for purposes of process control.

As a practical aspect of the design, the seal made by the intermediate tube sheet between adjacent compartments can be less rigorous if similar type heating fluids are used in adjacent compartments. While three compartments are illustrated, as many compartments as desired or as few as two can be used.

The present heat exchanger apparatus and method are illustrated by way of the foregoing description. The foregoing description is intended as a non-limiting illustration, since many variations will become apparent to those skilled in the art in view thereof. It is intended that all such variations within the scope and spirit of the appended claims be embraced thereby.

What is claimed is:

1. An integrated heat exchange apparatus for heating a tube-side fluid with a plurality of hot shell-side fluids comprising:
   a shell;
   a plurality of tubes extending vertically through the shell in fluid communication with upper and lower heads on either end thereof;
   a thermosiphon feed line from a thermosiphon feed reservoir to the lower head;
   a liquid-vapor return line from the upper head to the thermosiphon feed reservoir to complete the thermosiphon circuit;
   upper and lower tube sheets sealingly engaging the tubes between the shell and the upper and lower heads, respectively;
   at least one intermediate spaced-apart tube sheet sealingly engaging the tubes disposed between the upper and lower tube sheets to form a plurality of shell-side compartments; and
   a hot fluid supply and return line for each of the compartments to circulate the hot fluid therethrough to heat and vaporize the tube-side fluid, wherein the hot fluid in one or more of the compartments comprises an overhead vapor from a fractionation column for providing at least a part of the reflux condensate for the column, and the hot fluid in at least one other of the compartments is steam for providing process control.

2. The apparatus of claim 1 wherein the hot fluid circulation in each compartment is countercurrent.

3. The apparatus of claim 1 further comprising an outer vapor distribution and expansion chamber affixed to each compartment.

4. In a fractionation column thermosiphon reboiler apparatus wherein a feed from the column is heated for reboil by a plurality of hot fluid streams and returned, partially vaporized, to the column, the improvement wherein the thermosiphon reboiler comprises an integrated, vertical shell and tube heat exchanger having a corresponding plurality of separate compartments in the shell for circulation of a hot fluid stream through each compartment in heat exchange with the fluid in the tubes extending vertically therethrough.

5. The apparatus of claim 4, wherein the hot fluid stream in one or more of the compartments comprises an overhead vapor from a fractionation column for providing at least a part of the reflux condensate for the column and the hot fluid in at least one of the compartments is steam for process control.

6. A method for supplying reboil heat to a fractionation column with a plurality of hot fluid streams, comprising the steps of:
   (a) supplying liquid by a thermosiphon circulation system from the column to a lower head of an integrated vertical shell and tube thermosiphon reboiler;
   (b) passing the liquid from the lower head into a plurality of tubes which extend upwardly from the lower head to an upper head, wherein the tubes pass through a shell separated into a plurality of compartments formed by a tube sheet disposed between each adjacent compartment;
   (c) circulating a hot fluid through each compartment to heat and partially vaporize the liquid in the tubes;
   (d) collecting partially vaporized fluid from the tubes in the upper head; and
   (e) feeding the partially vaporized fluid from the upper head to the fractionation column.

7. The method of claim 6, wherein the circulating flow of the hot fluid is countercurrent to the flow in the tubes.

8. The method of claim 6, wherein the hot fluid in one or more of the compartments comprises an overhead vapor from a fractionation column for providing at least a part of the reflux condensate for the column and the hot fluid in at least one of the compartments is steam for process control.

* * * * *